Figure 1:
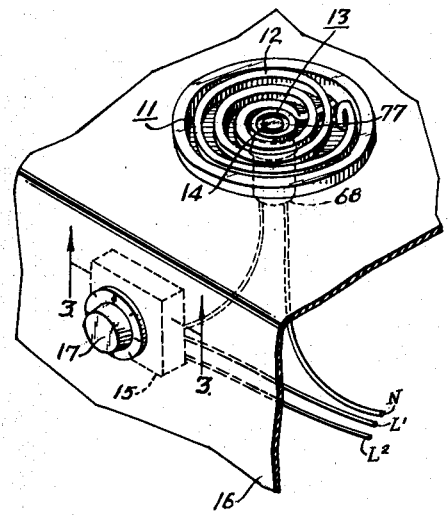

Jan. 8, 1963  D. E. CLAPP  3,072,773
APPARATUS FOR CONTROL OF COOKING TEMPERATURES
Filed March 27, 1956  4 Sheets-Sheet 1

INVENTOR:
DANIEL E. CLAPP
BY.
Howson & Howson
ATTYS.

Jan. 8, 1963     D. E. CLAPP     3,072,773
APPARATUS FOR CONTROL OF COOKING TEMPERATURES
Filed March 27, 1956     4 Sheets-Sheet 2

("OFF" POSITION)

(PRE-HEAT)

(TRIP)

INVENTOR:
DANIEL E. CLAPP
BY Howson & Howson
ATTYS.

Jan. 8, 1963 D. E. CLAPP 3,072,773
APPARATUS FOR CONTROL OF COOKING TEMPERATURES
Filed March 27, 1956 4 Sheets-Sheet 3
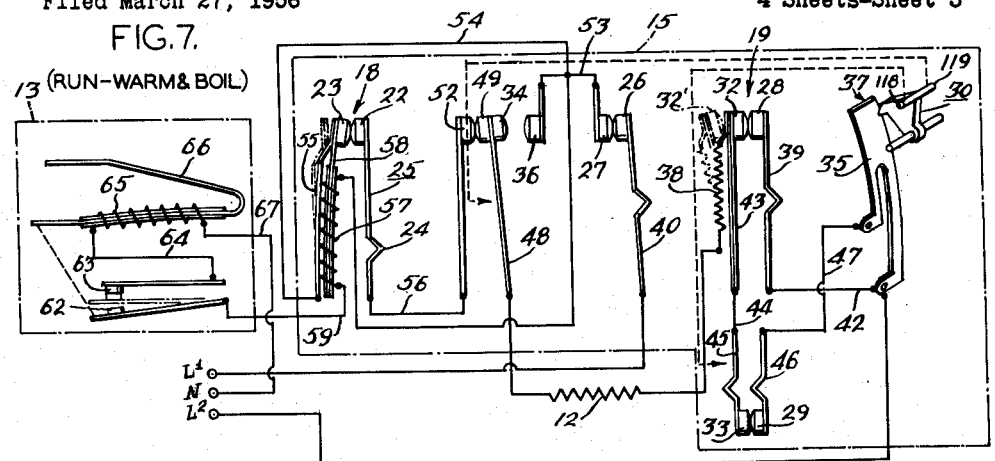
FIG. 7. (RUN-WARM & BOIL)
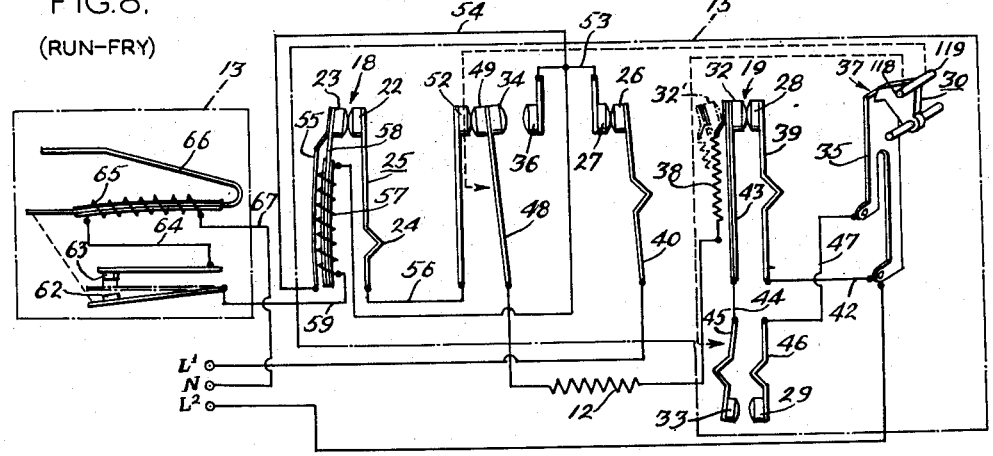
FIG. 8. (RUN-FRY)
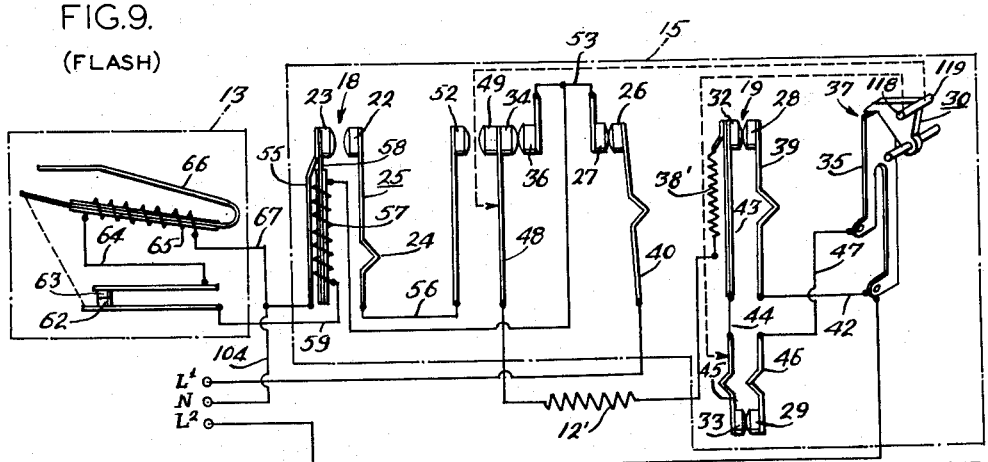
FIG. 9. (FLASH)
INVENTOR:
DANIEL E. CLAPP
BY Howson & Howson
ATTYS.

Jan. 8, 1963 D. E. CLAPP 3,072,773
APPARATUS FOR CONTROL OF COOKING TEMPERATURES
Filed March 27, 1956 4 Sheets-Sheet 4

INVENTOR:
DANIEL E. CLAPP
BY Howson & Howson
ATTYS.

United States Patent Office 3,072,773
Patented Jan. 8, 1963

3,072,773
APPARATUS FOR CONTROL OF COOKING
TEMPERATURES
Daniel E. Clapp, Somerton, Philadelphia, Pa., assignor to
The Proctor-Silex Corporation, a corporation of Pennsylvania
Filed Mar. 27, 1956, Ser. No. 574,287
14 Claims. (Cl. 219—20)

This invention relates to control apparatus for the energization of the heating units of a cooking range. While certain of its features are useful in the control of such operation regardless of the nature of the heating energy provided by the range, and regardless of the character of the cooking operation to be controlled, the invention was conceived and perfected in the solution of specific problems arising in the development of a commercially acceptable control apparatus for the resistance surface heater units of electric ranges to maintain a cooking vessel at a uniform temperature, and it will accordingly be described hereinafter primarily in relation to this type of unit.

Prior attempts to provide a commercially satisfactory control apparatus for this type of operation have presented a number of difficulties. In the first place, difficulty has been encountered in obtaining accurate sensing of the temperature of the pan to be controlled, since the sensing function has been vitiated by application of extraneous and irrelevant heat to the sensing unit. The apparatus by which such information as was obtained by the sensing unit was employed in the control function has often been cumbersome, expensive and inflexible in its response to a number of conditions encountered in use.

Attempts have heertofore been made to combine heat control apparatus of this general character, in which the cooking vessel is to be maintained at a substantially even predetermined temperature, with other units or parts of the apparatus designed to obtain rapid preheating or "flashing," to bring the vessel and its contents rapidly up to a temperature approximating that at which the further control is to be imposed to maintain a uniform cooking temperature. Here again, difficulties have been encountered for a variety of reasons. In some instances, the attempt to combine these features has resulted in an operation in which, when the surface heating unit was turned off and then turned on again rather promptly, an excess of heat was provided by intensive preheating or flashing of the already hot unit, pan and pan contents, with the result that damage was done.

The primary object of the invention has been to provide a control apparatus which provides the desired delicacy and rapidity of control of the heating operation, and which obviates all of the drawbacks of the prior art as discussed above.

More specifically, an object of the invention has been to provide a control of this character in which, by simple manipulation of a single control knob in either direction, the operator can provide automatic control of the cooking operation by which heat is first developed at a high and steady rate rapidly until the vessel attains a temperature only slightly below that for which the control is set, and this rate of heating is then gradually reduced by placing the energization of the unit on a controlled intermittent basis, until the desired temperature is attained and thereafter closely maintained.

A further object of the invention has been to provide a control of this character in which the temperature range which is provided may be maintained accurately within wide limits, and in which this temperature may be controlled through infinitesimally small gradations steplessly. The apparatus of the invention provides such control in ranges all the way between a low warming temperature of 120° F. and a high frying temperature of 420° F.

A further object of the invention has been to provide a control of this kind in which the intensity of the boiling operation may be varied to any desired degree by stepless adjustment of the control knob to any desired setting within this range.

A further object of the invention has been to provide an apparatus of this kind employing thermostatically operated switches controlled by thermomotive bimetal members, and in which the rate of cycling of the switch is maintained relatively slow, e.g., from three or four cycles per minute to as few as one per minute, in order to give the desired positiveness of control and minimize the phenomenon of overshoot.

A further object of the invention has been to provide an apparatus of this kind which will fail safely, i.e., in which the cooking operation will be stopped in case a breakage occurs in any part of the control circuit.

A further object of the invention has been to provide an apparatus of this kind in which the movement of the switch contacts between open and closed positions is clean and positive, and in which the switch contacts which control opening and closing of the load switch circuit are subjected to a constant rubbing action which maintains them clean.

A further object of the invention has been to provide a special protective arrangement which avoids storage of a high amount of heating energy within the surface heating unit when set at very high temperatures, such as those within the frying range.

A further object of the invention has been to provide a control apparatus of this character in which, if the primary control knob is turned on relatively soon after it has been turned off, the ensuing preheating or flashing operation will be accurately controlled to provide a desired degree of heating or flashing before the temperature control from the vessel again takes effect, but in which this preheating or flashing is limited in duration so as to avoid the possibility of damage.

A further object has been to provide a control of this kind in which the surface heating unit responds in a desirable manner if the pan or other vessel is removed for a brief interval from the range with the power turned on. In the control of the invention, additional heat is supplied at high settings under these circumstances, as compared to lower settings. This is exactly the response desired.

A further object of the invention has been to provide an apparatus of this kind which can be economically manufactured and which is compact and convenient in its relation to the cooking range.

Figure 2:
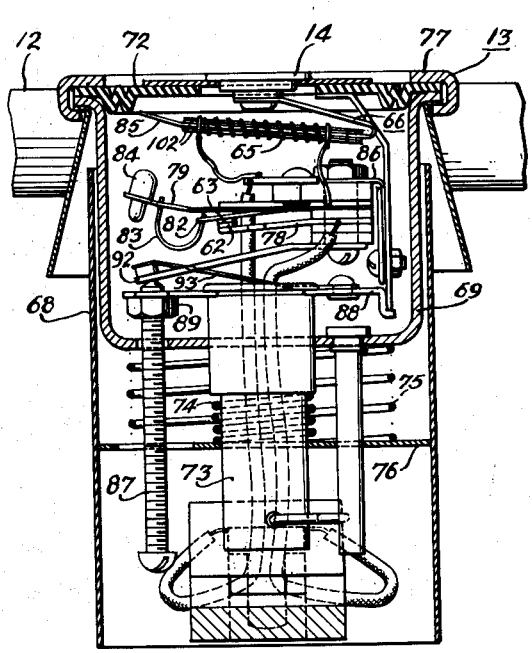
Figure 3:
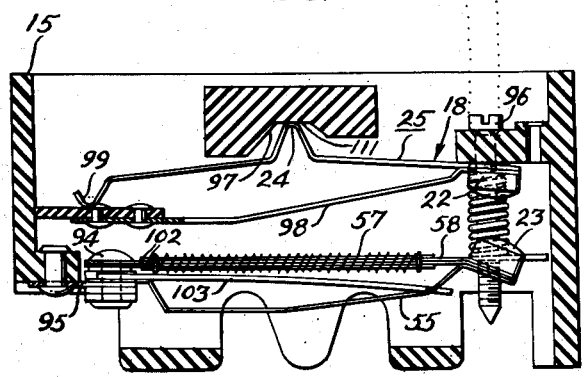
Figure 4:
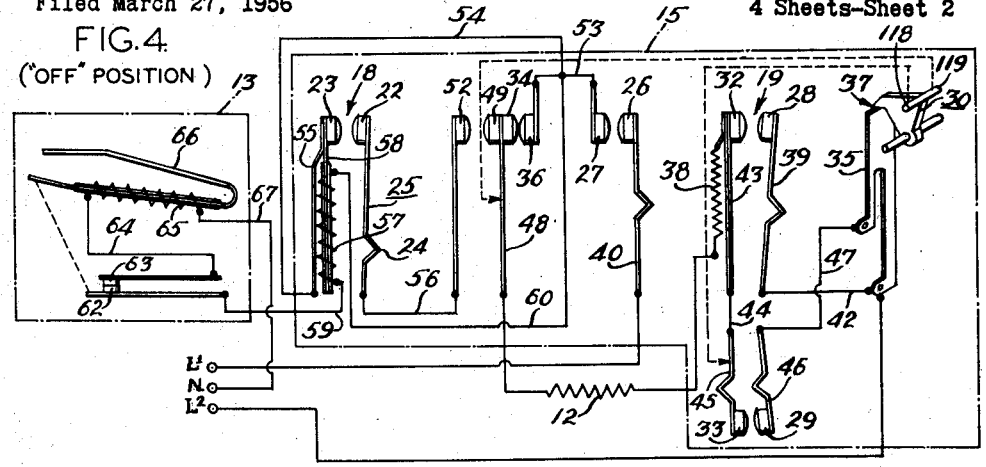
Figure 5:
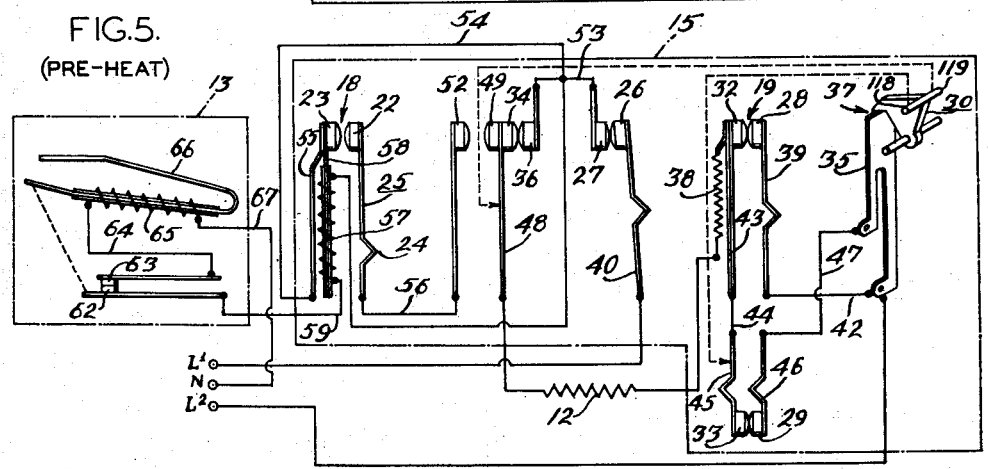
Figure 6:
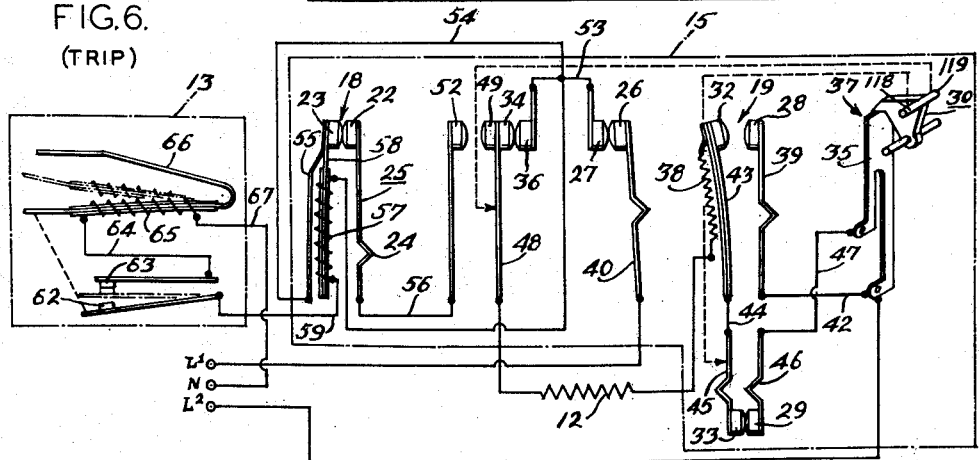
Figure 10:
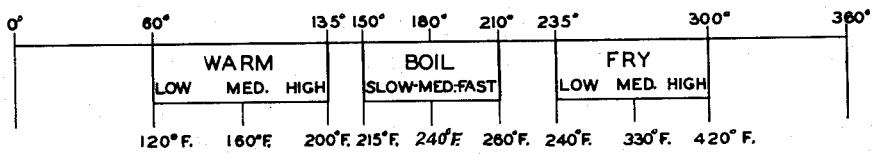
Figure 11:
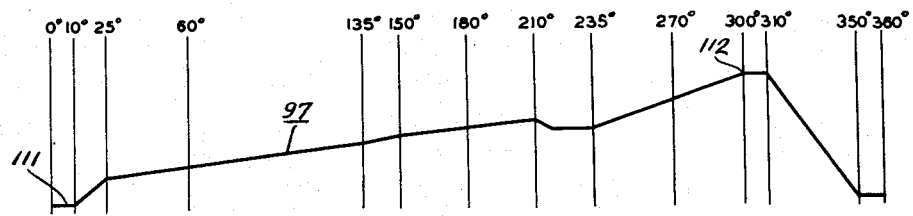
Figure 12:
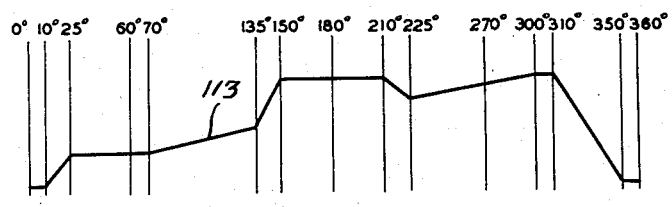
Figure 13:
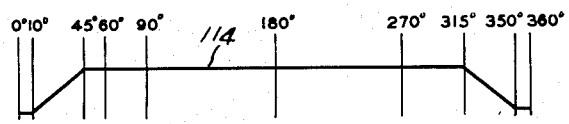
Figure 14:
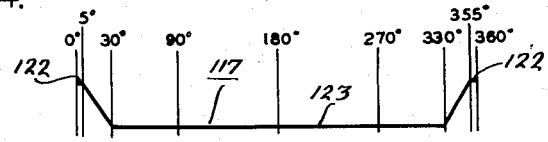
Figure 15:
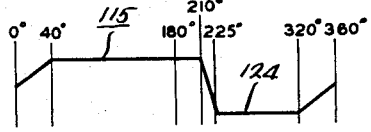
Figure 16:
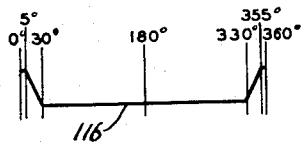

Still further objects and advantages of the invention, and the manner in which they have been attained, will be evident from reading of the following detailed description in the light of the attached drawing, in which:

FIGURE 1 is a perspective view of a portion of an electric range, showing a surface heating unit to which the invention is applied and a control therefor, FIGURE 2 is a central vertical cross-section through the detector and transmitter unit mounted centrally within and below the resistance heating unit of FIGURE 1, FIGURE 3 is a cross-section on the line 3—3 of FIGURE 1, FIGURE 4 is a diagrammatic view illustrating the various units of the invention in their circuit relationships to each other and to associated circuit and other elements and units of the invention, and showing the parts in the relative positions which they occupy when the control knob is turned to the "off" position, FIGURE 5 is a view corresponding to FIGURE 4 illustrating the positions which the parts occupy during the preheating period after the control knob is first turned on, FIGURE 6 is a similar view, illustrating the positions of the parts after the preheating operation has proceeded to a point just before transfer of the control apparatus from the preheating to the normal running operation, FIGURE 7 is a similar view, illustrating the relative positions of the parts after the preheating operation has been terminated and the apparatus transferred to the control of the units responsive to vessel temperature, FIGURE 8 is a view essentially similar to FIGURE 7, but illustrating the relative positions which the parts occupy when the control knob is first set at a position within the frying range, rather than a lower position within the warming or boiling ranges, FIGURE 9 is a view which corresponds in the cycle of operations to FIGURE 5, but which illustrates the application of the system in a modified embodiment involving substitution of a flash heating operation at quadruple the normal running rate, in place of the preheating operation of FIGURE 5, FIGURE 10 is a view illustrating the relationship of the angular settings of the control knob to the pan temperatures and cooking functions provided at these settings, FIGURE 11 is a view illustrating the contour of the cam controlling the position of the receiver contacts, FIGURE 12 is a similar view illustrating the cam contour controlling the positions of the anticipator contacts, FIGURE 13 is a similar view of the cam contour controlling the position of one of the line disconnect contacts, FIGURE 14 is a similar view of the cam contour controlling the positions of the latch, FIGURE 15 is a similar view of the contour of a cam employed for special control of the frying operation, and FIGURE 16 is a similar view of a cam controlling a second line disconnect switch.

As illustrated in FIGURES 1–3 of the drawing the control apparatus of the invention may be applied in the form of preheat, control and measuring circuits including a plurality of switches and related control elements mounted upon an electric range to control the energization of a heater 11, which in this instance is illustrated as an electric resistance surface heating unit 12 having its inner and outer ends connected to the opposite terminals of the load circuit.

The basic control units of the system include a detector and transmitter unit 13 mounted centrally within the heating unit 12 beneath a yieldably-mounted metallic disc 14 or the like which conducts heat directly from the central part of the pan downwardly into this unit. The unit senses the information which it thus receives and transmits it through a measuring or pilot circuit to a control unit housed within a casing 15 which is mounted remotely from the range surface heater, upon the front 16 of the range as illustrated or at other convenient location such as the splash board. This control unit includes a knob 17 secured to a shaft extending through the face of the unit, and the position of this shaft controls a plurality of cams which act upon the various cam followers as discussed hereinafter. These various followers and cams are preferably mounted within a single compact casing 15, as illustrated in FIGURE 1, and the cams are formed according to the principle illustrated in FIGURE 20 of Vogelsberg Patent 2,666,124, as separate concentric face contours upon a single rotary cam member controlled by knob 17. However, they have been illustrated in an exploded relationship in the diagrammatic views of FIGURE 4–9 of the drawing, in order that the circuit relationships of the invention may be clearly indicated.

As illustrated in FIGURE 4, the basic units of the invention include, in addition to the detector and transmitter unit 13 mounted centrally within and below the surface heating unit 12, a receiver and controlling unit 18 and an anticipator unit 19 which, together with other switches and terminal connections mounted within and upon casing 15, control the energization of the surface unit 12.

FIGURE 4 of the drawing illustrates the various switch connections and cam followers in the positions which they occupy when control knob 17 is in the "off" position, and neither the surface unit nor the pilot circuit units are energized. When control knob 17 is moved to any "on" position, the first result will be to change the switch connections to the relationships illustrated in FIGURE 5. Contact 22 of the control switch for the energization of heater unit 12 will be moved closer to its associated contact 23 to an extent depending upon the heating position to which control knob 17 is turned, this result being produced through the face cam portion 97 (FIG. 3) bearing against follower 24 of arm 25, which is normally spring-biased to the position of FIGURES 3 and 4. Switch contact 26 is brought by this same operation to close the main operating circuit through associated contact 27 of the master switch of the apparatus (see FIG. 5), and switch contacts 28 and 29 are brought into circuit-closing relationship to their associated contacts 32 and 33, respectively, in similar manner.

In the positions which the respective contacts within casing 15 occupy in the "off" position of FIGURE 4, or when first turned on as illustrated in FIGURE 5, contact 34 is held against contact 36 by latching unit 37, and contact 33 is similarly held in the position illustrated in FIGURES 4 and 5, this control being similar to that provided by the corresponding co-acting latch 30 and latch prop 35 of Vogelsberg Patent 2,666,124, in controlling the positions of contacts in that patent.

The source of electrical energy for this system may be a conventional three wire system including lines $L^1$ and $L^2$ which provide 236 volts when interconnected, and a neutral line N providing 118 volts when connected to either of them. With the parts in the positions of FIGURE 5, a current is established from lead $L^1$ through contacts 26, 27 and 36, 34, the surface heater unit 12, a resistance heater 38 and thence through contacts 32, 28, arm 39 and line 42 to return line $L^2$. The heating operation of the range is thus commenced immediately by the turning of knob 17 to any operative position, and this heating operation will be maintained continuously through this preheat circuit until this circuit is broken.

The resistance heater 38 in the circuit thus established is in close proximity to a bimetal supporting arm 43 which constitutes a thermomotive member for controlling the position of contact 32. At the start of the heating operation, contact 28 is in resiliently overclosed position against contact 32, the extent of overclosure depending upon the degree of rotation of the cam operating against cam follower arm 39, as determined by the control knob. When the thermomotive bimetal 43 has flexed sufficiently to open the circuit between contacts 32 and 28, as illustrated in FIGURE 6, current passing through surface heater 12 and the thermomotive control heater 38 will be compelled to follow an alternative conductive path from heater 38 along bimetal 43, line 44, control arm 45 of contact 33, through contacts 33 and 29, control arm 46, line 47, and latch prop bimetal member 35, in returning to line L².

This alternative path is of substantially higher resistance than the direct path through contacts 32 and 28, and there will accordingly be very little current flowing through the latch prop bimetal 35 so long as the circuit is closed through contacts 32 and 28. Just as soon as these contacts have been opened to the position of FIGURE 6, however, the full flow of current is established as discussed above through bimetal latch prop 35, with the consequence that this prop is rapidly heated up to the point at which it flexes to release latch 30, as illustrated in FIGURE 7.

Both arm 45 carrying contact 33 and double-throw switch arm 48 carrying contacts 34 and 49 are resiliently urged away from the positions in which they are latched as illustrated in FIGURES 4–6, and arm 48 is released from its position in which contacts 34 and 36 establish the circuit as discussed above, when the latch is released. Arm 45, while released from the holding effect of the latch, will remain in the position illustrated in FIGURE 7, in which the contacts 33 and 29 remain closed, provided the cam controlling cam follower arm 45 is set by the position of knob 17 at a point within the warm or boil range. When the knob is turned to the higher "Fry" setting, however, the cam follower of arm 45 will come opposite a relieved portion of the cam face controlling it, and will accordingly spring open to the position of FIGURE 8. The purpose of this control will be discussed hereinafter.

Assuming now that the control knob 17 has been turned to a setting within the warm or boil range, and that the continuous preheating operation has been terminated by release of latch 37 and arm 48, this release establishes the normal heating operation of FIGURE 7 under the control of the pan temperature as follows. Since contacts 49 and 52 are now closed as illustrated in FIGURE 7, a circuit will be established from line L¹, through contacts 26 and 27, lines 53 and 54, metal tension strip 55, contacts 23 and 22, arm 25, line 56, contacts 52 and 49, the surface heater 12 and the elements 38, 32, 43, 44, 45, 33, 29, 46 and 35 to return line L².

Since contacts 23 and 22 are normally open, as illustrated in FIGURES 4 and 5, a few words of discussion are in order to explain how they are moved from the open position of FIGURE 5 to the closed position of FIGURES 6 and 7 during the latched-in preheating period, so that the heating circuit is established as discussed above immediately at the end of that period. By reference to any of FIGURES 4–8, it will be seen that when contacts 26 and 27 are closed by turning of knob 17 to any "on" position as discussed above, this will establish a further circuit in addition to the main load circuit as already described. This measuring or pilot circuit is established for the purpose of providing a desired control of the opening and closing of contacts 22 and 23, and runs from line L¹ through contacts 26 and 27, line 60, resistance heater 57 surrounding bimetal arm 58 controlling the position of contact 23, line 59, the normal closed contacts 62 and 63 of the detector unit 13, line 64, resistance heater 65 surrounding a portion of a U-shaped bimetal strip 66, and line 67 to the neutral line N. The movement of switch contact 23 from the open position of FIGURE 5 to the closed position of FIGURES 6–8 is thus the result of the heating of thermomotive bimetal 58 by resistance heater 57, and when this contact has been thus established and the latch tripped to close the heating load circuit through contacts 49 and 52 and surface heater 12, the further control of energization of heater 12 is thenceforth transferred to detector 13 and receiver 18 and to the pilot circuit forming a part of both of these units as discussed above.

In the foregoing discussion of the closure of switch contacts 22 and 23, it should be assumed that a pan containing material to be cooked is resting upon the disc or medallion 14 and the surface heating unit 12 during the preheating period. As illustrated in FIGURE 2, the medallion is in direct heat conductive relationship to the upper arm of the bimetal thermomotive control member 66, and this control member is therefore subject to the combined heating influence of the resistance heating element 65 surrounding its lower arm and the temperature derived directly by its upper arm from the pan through medallion 14. When the temperature of the thermomotive element reaches a pre-determined control point determined by its inherent characteristics and initial calibration, the contacts 62 and 63 will be opened to break the pilot circuit through resistance heaters 57 and 65, with the result that thermomotive members 58 and 66 will again flex toward their initial positions in which contacts 63 and 62 are maintained closed and contacts 22 and 23 are maintained open.

This initial flexing of bimetal 58 toward open contact position will not, however, ordinarily effect opening of the load circuit through contacts 22 and 23 and surface heater 12, since these contacts are ordinarily over closed by the adjustment of arm 25 and the heating effect of the heater 57 to an extent which is not overcome by the cooling due to the duration of interruption of current through contacts 62 and 63. After a brief period during which heat is derived by thermomotive bimetal 66 only from the pan, this bimetal will have cooled off to a point at which contacts 62 and 63 are again closed, and the heating of bimetals 58 and 66 by heaters 57 and 65 is resumed.

From the foregoing discussion, it will be seen that bimetals 58 and 66 will be flexed in opposite directions in unison as the pan temperature is increased by continuous passage of current through contacts 22 and 23 and the heating load 12. As the temperature desired to be maintained is approached by the vessel being heated, however, the intervals of current interruption through contacts 62 and 63 and consequently the intervals during which resistance heaters 57 and 65 are de-energized become longer and longer. Bimetal 58 is therefore progressively cooled off step-wise as the result of these interruptions and, as the temperature of the vessel approaches the temperature set by the position of arm 25 in response to the setting of control knob 17, contacts 22 and 23 will be opened for the first time. The heating operation performed by surface heating unit 12 will therefore be interrupted. After a brief interruption, the heating of bimetal 66 by heater 65 is resumed as the consequence of flexing of bimetal 66 into position closing contacts 62 and 63. The cycling of the resulting circuit including heaters 57 and 65 continues in this manner and the interruptions of heat energy to unit 12 become progressively longer as the selected temperature level of the vessel is approached. By the time the control temperature is reached, the available rate of energization of the resistance heater 12 through contacts 22 and 23 will have been decreased by the increasing length of the "off" periods to such extent that there may be little or no overshoot of the pan temperature. Once the desired control temperature is attained, this temperature will be closely maintained by the cycling of the contacts 62 and 63 on the one hand and 22 and 23 on the other, according to the same principles discussed above for the operation during the approach to the control temperature.

In connection with the control of the energization of heater 57 by opening contacts 22 and 23 in response to cooling off of bimetal 58, it should be noted that this not only provides outstandingly effective control but that it also causes the unit to fail safely in case of any break in the circuit, since closure of the load circuit through contacts 22 and 23 can result only from flow of current through the measuring or pilot circuit.

In the foregoing discussion, we have assumed that the setting of control knob 17 is at a point within the warm or boil range of the control apparatus and that contact 33 is accordingly secured in closed position against contact 29 by the operation of the associated cam controlled by knob 17 against the cam follower of arm 45. As discussed above, when the knob 17 is turned to a setting higher than boil, i.e., in the "Fry" range, a relieved portion of the cam controlling arm 45 comes opposite the cam follower of that arm, with the consequence that, when latch 30 is released by the flexure of latch prop 35, arm 45 springs into the position illustrated in FIGURE 8, in which the switch contacts 33 and 29 are opened. This throws the operation of the load circuit under the control of switch contacts 32 and 28. During the normal operation of the load heating circuit at an intermediate temperature subsequent to tripping, the contact 32 is maintained away from contact 28, as indicated at 32' in FIGURE 7, by reason of the fact that bimetal 43 is constantly heated by the resistance heater 38. When the circuit is interrupted through the contacts 33 and 29 by the tripping of the latch while the control knob is set to "Fry," however, and the contacts 32 and 28 are in open position as indicated at 32', the circuit through the heater load 12 and resistance heater 38 will be broken with the consequence that bimetal 43 will again coil off and flex to the closed position illustrated in FIGURE 8. The contact 32 will thereafter cycle between the open and closed position under control of heater 38 and bimetal 43, as the heating operation progresses. This cycling is especially desirable in the "Fry" settings, since these settings are often applied with relatively light pan loads, and continuous energization of the surface heater unit 12 would accordingly result in serious problems of overshoot and might also result in damage to the cooking vessel. When the apparatus is set to maintain a frying temperature, this protection is therefore automatically superimposed upon the temperature control provided by the contacts 22, 23 and 62, 63, as discussed above.

In connection with this protection of the frying operation, it should be noted that the control of the position at which contact 28 is set by the operation of its control cam against the follower of arm 39 has an important effect in addition to that of controlling the duration of the preheat period. At the higher frying temperature settings, the cam controlling the position of arm 39 advances the position of contact 28 into very substantially over-closed relationship to opposed contact 32, assuming that bimetal 43 is in the unflexed condition. A substantially larger amount of energy is required to be derived by bimetal 43 from resistance heater 38 to overcome this over-closure and move contact 32 to open position than is the case at the setting of arm 39 by lower temperature settings of knob 17, and the consequence of this fact is that the ratio of "on" to "off" time of the contacts 32 and 28 is much greater at these high temperature settings than at lower ones. This is important in order that the cooking load may attain the desired operating temperature rapidly. In this regard, as also in regard to rapid response to addition of further contents to a vessel already being subjected to a cooking operation, this invention provides a type of control which is outstandingly rapid and responsive. When a load of fat is maintained at a desired cooking temperature and a large quantity of potatoes is suddenly deposited in this fat for the performance of a French-frying operation, for example, it is important that the heating controls operate very rapidly to attain the desired temperature following the cooking effect of the additional load, and this is achieved by the controls discussed above.

Important advantages are attained in practice of the invention by utilization of a snap switch of the type illustrated in Turner Patent 2,691,082 as the controlling member for the switch contacts 62 and 63 of the transmitter unit 13, and by protecting the heat sensing apparatus located centrally of this unit by heat shielding and grounding apparatus according to the principles of Turner Patent 2,699,487. As illustrated in FIGURE 2, the heat shield and grounding apparatus includes an annular radiant heat shield 68 surrounding this unit in spaced relationship so as to reflect a major portion of the heat which would otherwise be radiated to this transmitter unit from the surrounding resistance surface heater 12. In spaced relationship within this shield, a further shielding and heat grounding member is provided in the form of a cup 69 which is substantially closed at its lower end, and which carries at its upper flanged end an elastic diaphragm 72 which supports at its inner circumference the medallion structure 14 through which heat is transmitted from the pan into the sensing apparatus of the transmitter. The inner portion of diaphragm 72, as well as the medallion and the underlying thermomotive member 66 carried thereby is supported by post 73, which is urged upwardly by spring 74 so that a vessel placed upon surface heating unit 12 rests upon medallion 14 with this resilient support. The cup 69 is urged upwardly by the separate spring 75 confined between the upper surface of a supporting surface 76 and the bottom of the cup. Excellent contact is thus assured, both between the upper surface 77 and a pan placed upon the range, and between medallion 14 and such pan.

The thermostatically controlled switch per se of this transmitter unit includes the pair of switch contacts 62 and 63 which are supported upon arms 78 and 79, respectively, the contact 63 being supported by a lancing 82 from arm 79. The arm 79 and lancing 82 carry opposite ends of a loop spring 83, and an actuating button 84 of insulating material is also carried by arm 79. This actuating button underlies an extension 85 of the lower branch of the bimetal 66. These parts are supported from post 73 and associated structure through a spring hinge 86, and the pivotally supported position of the parts, including actuating button 84, is initially calibrated or adjusted by a screw 87 secured in adjusted position upon the base plate 88 of the switch-supporting structure by nut 89. The upper end of this screw abuts the underside of a bimetal arm 92, which is held by spring 93 in contact with the upper end of the screw. The essential features of this switch are similar to those described in Turner Patent 2,691,082, and an understanding of the operation of the switch can readily be had from consideration of that patent. The bimetal arm 92 serves, due to flexing under the influence of heat, to compensate for changes in ambient temperature within the chamber formed within cup 69, the underside of this arm 92 being the high expansion side. The inside portion of the U-shaped bimetal strip 66 is the high expansion side, with the consequence that, upon application of heat to this bimetal, either by conduction from the pan, or by heat derived from resistance heater 65, the extension 85 of bimetal strip 66 moves downwardly until it ultimately contacts the actuating button 84. When the resulting movement of the actuating button 84 has continued to a point bringing loop spring 83 beyond its switch-opening position, the contacts 62 and 63 will be sprung open to the position illustrated in full lines in FIGURES 6-8. This snap-action opening provides a very important feature of the invention, since it enables me to control the operation through a switch which requires substantial amplitude of movement of bimetal 66 to effect the opening and closing movements of the switch, with the consequence that the opening and closing of the switch can be delicately controlled by the bimetal, but at the same time operate to provide a much longer cycle length than otherwise would be obtainable with this consistent delicacy of control. The space limitations within the detector location would create great difficulty in attaining such control in the absence of this feature. The cycle lengths in the opening and closing of a unit operating satisfactorily in the performance of the present invention may vary between 15 seconds and 1 minute.

Further important features of advantage are attained in practice of the invention by certain details of construction of the switch actuating mechanism of the receiver unit 18. As illustrated in FIGURE 3, the bimetal arm 58 carrying switch contact 23 is mounted for flexing movement about an anchor in the form of a rivet 94 at its left end. This rivet is secured to the supporting casing structure 15 through a spring hinge member 95, and the position of this spring hinge may be adjusted by a calibrating screw 96 after the fashion illustrated in FIGURE 7 of Hortman Patent 2,697,156. There is also secured to the rivet 94 and to the opposite end of bimetal strip 58 adjacent to the contact 23, the resilient metal conductor strip 55 which forms a part of the load circuit through contacts 22 and 23 and the surface heater unit 12 when these contacts are closed as discussed above. The strip 55 is a relatively light metal member of substantially less mass than the bimetal 58, and its is secured in position to place it under tension in its association with the bimetal strip as the bimetal strip flexes to permit closure of the contacts. There will therefore be a tendency, on the part of this strip 55, to resist movement of contact 23 toward contact 22. This tendency will be relieved however, by the thermomotive expansion of strip 55, once the contacts have been closed and this strip is heated by the load current passing through it. Once the load circuit has been opened, however, due to cooling of bimetal 58, the resulting contraction of strip 55 will tend to cause still cleaner separation of the contacts. The thermomotive action of strip 55 therefore produces more positive switch action, and it also restrains initial opening of contact 23 and thus permits a close approach to the temperature desired to be maintained, before cycling of contacts 22 and 23 begins. This strip may be made of any material having the desired resilience, fatigue strength and other physical properties, together with sufficient electrical resistivity to generate the desired heating within the strip. It may, for example, be a copper-nickel alloy.

The tension strip 55 is located sufficiently far from the bimetal 58 to avoid substantial interchange of heat between these members, so that the thermomotive effect of the tension strip 55 is solely one of first offsetting and then accentuating the opening and closing forces applied to the contacts 22 and 23, due to its successive expansion and contraction as discussed above. By reason of the provision of tension strip 55, it is possible to obtain, in the design of this apparatus, an operation in which the temperature transmitted by the pan through medallion 14 to the transmitter apparatus approaches very closely to the desired temperature to be maintained, before the "on" and "off" cycling of the contacts 22 and 23 is commenced. This enables us to obtain very rapid heating of the unit until the desired control temperature has been substantially attained, and then to approach that temperature at a decelerating rate until the desired condition is attained and thereafter maintained.

The setting of contact 22 and its associated arm 25 is controlled in position by the face cam member 97 (FIGS. 3 and 11), and the arm 25 is maintained in cam-following relation to this cam by a spring 98, the free end 99 of arm 25 serving as a fulcrum for this adjustment. The arm 25 is preferably provided as a bimetal with the under side as illustrated in FIGURE 3 the high expansion side, and the under side of bimetal strip 58 is also the high expansion side thereof. As a consequence of these facts, the arm 25 serves as an ambient temperature compensator for the bimetal strip 58, with the result that the erratic operation which would otherwise be created by ambient temperature changes at the location of control casing 15 is thus eliminated. An insulating strip 103 is preferably positioned between the tension strip 55 and the electric heater winding 57 about bimetal 58, in order to avoid any chance of short circuiting, and electric insulation is also provided at opposite sides of bimetal strips 58 (FIGURE 3) and 66 (FIGURE 2) in the form of mica strips 102 about which the heater turns 57 and 65 are wound.

In the alternative form of the invention illustrated in FIGURE 9 of the drawing, the connections are identical with those discussed above, except for the fact that the tension strip 55 is interconnected directly with the neutral line N. As a consequence of this fact, when latch 37 is released, and contact 49 springs from the position illustrated into the circuit-closing relationship to contact 52, the load current will be established from line $L^2$ through latch prop 35, contacts 29 and 33, heaters 38' and 12', contacts 49 and 52, contacts 22 and 23, tension strip 55 and line 104 to neutral line N. Since the potential difference between lines $L^1$ and $L^2$ is double that between lines $L^2$ and N, and since the normal energization of the heating unit 12 involves utilization of this lower voltage between $L^2$ and N, it will be seen that the energization across lines $L^1$ and $L^2$ as developed during the flash period corresponding to the preheat period of the embodiment of FIGURES 4-8 is quadruple that obtained in normal running. When this system of flash preheating is substituted for the normal preheating operation of FIGURE 5 in design of the system, the resistance of the surface heater unit 12 will of course be adjusted downwardly so that the effective heating achieved by this unit at 118 volts is comparable to that attained by the corresponding unit of FIGURES 4-8 at 230 volts, and the flash energization is quadruple this normal running energization. In the non-flashed embodiment of FIGURES 4-8 the resistance of the unit 12 may be about 26.5 ohms to provide 2100 watts during continuous running, while in the flashed embodiment of FIGURE 9 the resistance of unit 12' may be about 8.5 ohms to provide 1600 watts in normal running and 6400 watts during the flash period. The duration of the latched-in preheat period will also be shortened in the embodiment of FIGURE 9 so that the flashing will ordinarily be restricted to less than 30 seconds, whereas the corresponding preheat period of FIGURES 4-8 may continue for as long as 90 seconds. This difference is primarily the result of use of the higher voltage during flashing, with resulting higher current. The heater 38' in the embodiment of FIGURE 9 will ordinarily be of slightly lower resistance than the heater 38 of FIGURES 4-8. A small auxiliary heater may also be employed in the flashed embodiment in heating adjacency to latch prop 35 to maintain this heated during normal running in the "Fry" range, i.e., with contacts 33 and 29 in the open position, in order to prevent a reflash, with consequent damage, in case the unit is turned off and then quickly turned on again.

It should be realized, in considering the embodiment of FIGURE 9, that the cycle of operations is essentially the same as that of FIGURES 5-8, except for the greater intensity and shorter duration of the preheat period. The circuit conditions of FIGURE 5 correspond in function to those of FIGURE 9, and when the arm 48 is released in the embodiment of FIGURE 9 to the left hand position of FIGURE 7, the ensuing operations and the controls imposed are the same in both embodiments, with the exception that the circuit is established at 118 volts instead of 236 in the form of FIGURE 9. All other aspects of the controls operate similarly in the two cases, however, whether the control knob 17 be set for "warm," "boil" or "fry."

FIGURES 10-16 of the drawing illustrate the relation of control knob 17 to the various cam contours associated therewith for simultaneous rotation to obtain the desired temperature settings. In these figures and the following discussion when I refer to temperatures the letter "F" will follow the degree mark "°." Otherwise, all figures associated with this mark refer to degrees of counterclockwise rotation of the control knob and cams from their zero settings. As illustrated in FIGURE 10, if it be desired to produce and maintain a low warming temperature of 120° F., the knob will be turned from its "off" or 0° setting through a counterclockwise angle of 60°. For a low frying temperature of 240° F., it will be turned counterclockwise through an angle of 235°, or more simply clockwise through an angle of 125° to the same position. If water is contained in the pan or vessel to be heated, boiling may be obtained by a setting anywhere between 150° and 210°, depending upon the rapidity of the boiling operation desired, and if no water is contained in the vessel, a temperature of 260° F. may be maintained at the 210° setting or a temperature of 215° F. at the 150° setting.

FIGURE 11 shows the developed contour of the face cam track 97 (see also FIG. 3) as followed by cam follower 24 of receiver switch arm 25 in adjustment of the control knob to a desired temperature setting. In the 0° or "off" position of the control knob, the follower abuts the point 111 of the cam contour, and at the 300° setting it abuts the point 112. In similar manner, the followers on arms 39, 40, 45 and 46 abut the 0° positions of cams 113, 114, 115 and 116, respectively when the knob is turned off, and they abut corresponding angular positions of their respective cams when the knob is turned to any "on" position.

From FIGURE 14 it will be seen that cam 117 acts upon a cam follower of latch 30 to rotate that latch into latching position when the knob is turned clockwise through the arc from its 30° setting to its 0° setting or counterclockwise from its 330° setting to this 0° or 360° setting, in the same manner that that latching is attained by camming surface 6 acting upon latch 30 in Vogelsberg Patent 2,666,124.

The operation of the latch and of the various switches controlled by the face cam surfaces is the same as that of the Vogelsberg patent in the following regards. While the cam followers occupy various angular positions relative to the control knob 17, the contours of the cam surfaces are related to these positions in such manner that all switch arm and latch followers abut the 0° positions of their respective cams when the knob 17 is in its 0° position. After this position is reached and latch 30 has thus been rotated to the latching position of FIGURES 4-6 and 9, cam 117 will support latch 30 in position in which its arms 118 and 119 (corresponding to arms 28 and 29 of FIGURES 11, 12 and 17-19 of Vogelsberg, 2,666,124) abut arms 45 and 48. As in the Vogelsberg patent, all of the cam tracks of FIGURES 11-16 are formed as concentric circular portions of a unitary cam member, the receiver and anticipator contours 97 and 113 being on the largest circular tracks, and the contours 114, 117, 115 and 116 being on progressively smaller circumferences.

When the control knob is moved from its 0° position to any operative position, this not only rotates cam contours 97 (FIG. 11) and 113 (FIG. 12) to positions advancing contacts 28 and 22 from the positions illustrated in FIGURE 4 to positions such as illustrated in FIGURE 5, but it also rotates contours 114 and 116 (FIGS. 13 and 16) to positions closing line disconnect contact 26 and permitting line disconnect contact 29 to close. At the same time, the contour 117, rotating through a similar angle, will be rotated from a position in which its crest 122 supports latch 30 to a position in which the latch is supported in closing relationship to contacts 33 and 34, as illustrated in FIGURES 4-6 and 9, solely by the support offered by latch prop 35. Since the flat portion 123 of contour 117 underlies the latch cam follower when the knob is turned to an operative heating position, latch 30 is permitted to rotate in a counter-clockwise direction as illustrated, from the positions of FIGURES 4-6 and 9 to the positions of FIGURES 7 and 8, thereby releasing contact carrying arms from the position of FIGURE 6 to the position of FIGURE 8 when the latch prop support 35 is released by flexure of this member as illustrated. However, the supplemental support provided against the cam follower of arm 45 by cam contour 115 will hold this arm in the position illustrated in FIGURE 7, unless the control knob is set within the "Fry" range, i.e., unless it is set at a position between 225° and 320° (see FIG. 15) of counter-clockwise shaft rotation to bring the surface 124 of cam contour 115 into position behind the follower of arm 45 and release it for movement to the open position illustrated in FIGURE 8.

*Summary of Operation*

Let us assume now that the surface heater unit 12 is cold and that the control knob 17 is rotated from "off" position counterclockwise through 135°, with a cooking vessel resting on the unit. Since each of cam contours 97, 113, 114, 117, and 116 is rotated to its 135° position by this movement, contacts 26 and 29 will be moved from the position of FIGURE 4 to the position of FIGURE 5, thereby closing the circuit from $L^1$ to $L^2$ through surface heater unit 12 to provide continuous heating through this circuit including contacts 34 and 36 until the preheat period is ended and the pilot circuit and vessel temperature take control of the heating operation. At the same time, cam contour 113 overcloses contact 28 against contact 32 to an extent determined by the 135° position, thereby determining the amount of flexure of arm 43 required to separate contact 32 from contact 28, and hence the time alloted to preheating.

As the preheating progresses to the point at which contact 32 is separated from contact 28, as illustrated in FIGURE 6, and then to the point at which latch prop 35 flexes to release latch 30, as illustrated in FIGURE 7, the circuit through contacts 36 and 34 will be broken, but a second circuit will be established through contacts 52, 49, 22 and 23 as illustrated in FIGURE 7 and discussed above. The establishment of this circuit depends, in addition to the latch release, upon the fact that, in the meantime, the measuring or pilot circuit through heater coils 57 and 65 has caused bimetal 57 to flex and move contact 23 against contact 22, with an overclosure dependent upon the setting of arm 25 in response to the 135° setting of cam contour 97 (FIGS. 3 and 11).

The heating of the vessel and its contents will now be continued under the monitoring effect of the pan temperature and measuring circuit as they cause opening and closing of switch contacts 62, 63 and 22, 23. Contacts 22, 23 will be maintained closed and heat will be provided continuously to the heating unit 12 and tension strip until the temperature of the bottom of the pan as transmitted through medallion 14 to bimetal 66 approaches the temperature of 200° F. corresponding to the 135° angular setting.

The switch contacts 62, 63 will first be opened at a time which is determined entirely by the temperature of bimetal strip 66 as derived from heater 65 and medallion 45, and this first opening has no relationship to the degree of overclosure of contacts 22 and 23 as determined by the 135° angular setting of cam contour 97.

As contacts 62 and 63 are opened, however, there will be a relative movement of contact 23 tending to separate it from contact 22, and this continual rubbing movement has a desirable effect in keeping these contacts clean. Unless the temperature at which contacts 62 and 63 first open is closed to the temperature of 200° set by the 135° setting of receiver cam contour 97, however, contacts 22 and 23 will not open at this time. Upon repeated closure and reopening of contacts 62 and 63, however, with increasing ratio of open to closed time due to increasing vessel temperature, switch contacts 22 and 23 will be opened as discussed above, to permit temporary interruption of energy to the surface heater unit. Contacts 22 and 23 will thereafter be closed and opened with an increasing ratio of open to closed time until a temperature condition of equilibrium is attained at the setting resulting from the position of contact 22 established by cam 97.

During the operation discussed above, if the control knob is turned off, the surface unit 12, the resistance heater 38 and the latch prop 35 will be de-energized. At the same time, cam 117 will be moved, together with all other cam controls, to the zero position, and its ledge 122 will abut the cam follower surface of latch 30, thereby holding each of contacts 33 and 34 in the positions illustrated in FIGURES 4-6 and 9. When the control knob is next turned to an operative position, latch 30 will again be supported by latch prop 35, and bimetal 43 will again have moved contact 32 into closed position against contact 28, provided a sufficient time has elapsed to allow cooling to effect these movements. The pan contents will accordingly be subjected to a further continuous preheating under the monitoring effect of the anticipator controls until bimetal 43 has again separated contact 32 from contact 28 and latch prop 35 has again released latch 30.

If we assume now that the control knob is set to an intermediate "Fry" position of 267½° corresponding to a temperature of 330° F. (FIG. 10) it will be seen that the relieved cam surface 124 of cam contour 115 will lie opposite the cam follower of arm 45. As a consequence of this fact, this arm will be permitted to swing to the position of FIGURE 8 upon the release of latch 30. Current passing through surface heater 12 must accordingly pass through contacts 32 and 28, with the result that the flow of load current will be intermittent as controlled by heater 38, bimetal 43 and contacts 32 and 28, even before it is interrupted further by the operation of the receiver contacts as discussed above. This limits the temperature which may be attained by the surface heater 12 and thus minimizes the tendency to overshoot, which is otherwise especially serious under light frying pan loads.

It will be seen that, as control knob 17 is set at a larger counterclockwise angular position to provide a higher cooking temperature, this not only moves cam contour 97 to a position requiring a higher vessel temperature to open contacts 22 and 23, but that it also moves cam contour 113 controlling the position of arm 39 to an extent providing a longer preheating period through the warming and boiling ranges. The preheating operation is designed to be of shorter duration in the lower parts of the frying range than in the boiling range (see FIG. 12), due to the fact that the vessel and contents are frequently of low mass in frying operation. As will be evident from the portions of cam 113 between 225° and 310°, however, the duration of preheating for a frying operation is progressively increased as the setting of cam contour 97 is increased to provide a higher ultimate controlled temperature.

From consideration of FIGURE 12 it will also be evident that the ratio of time on to time off is increased for contacts 32 and 28, as the control knob is set to higher temperature control positions within the frying zone.

From the foregoing discussion it will be evident that I have provided a control apparatus by which every one of the objects of the invention is attained. While the features have been discussed primarily in relation to a single specific embodiment, it will be evident to those skilled in the art that the invention may be modified and refined in various ways. I therefore wish it to be understood that this invention is not to be limited in interpretation except by the scope of the following claims.

I claim:

1. In control apparatus for an electric heating unit, the combination comprising preheating circuit means including the heating unit load, means independent of temperature derived from the heating operation for adjusting said circuit means to establish the duration of preheating said unit, normal running circuit means operable at the conclusion of said preheating and also including said heating load, separate means for adjusting the energization of said normal running circuit means in response to heat derived from heating operation, and common manual means for simultaneously adjusting the control positions of said first-mentioned adjusting means and said separate adjusting means.

2. In control apparatus for an electric heating unit, the combination comprising preheating circuit means including the heating unit load, means independent of temperature derived from the heating operation for adjusting said circuit means to establish the duration of preheating said unit, normal running circuit means operable at the conclusion of said preheating and also including said heating load, separate means for adjusting the energization of said normal running circuit means in response to heat derived from the heating operation, and common manual means for simultaneously adjusting the control positions of said first-mentioned adjusting means and said separate adjusting means, said adjusting means comprising cam contours on a face cam, operable against cam followers controlling the movements of arms carrying contacts of switches in the preheating circuit and normally running circuit for controlling respectively the duration of preheating and the temperature of a cooking vessel resting in heat exchange relation to the heating unit.

3. In control apparatus for an electric surface range heating unit, the combination comprising preheating circuit means including the heating unit load and also including an electric resistance heater and a pair of co-acting switch contacts in circuit with said load, a bimetal arm in heat exchange relation with said electric resistance heater, said bimetal arm carrying one of said switch contacts and movable into switch-opening position in response to heat derived from said electric resistance heater, said preheating circuit including a separate branch through which current is compelled to flow upon opening of said switch contacts, said separate branch including a pair of switch contacts and a latch prop in the form of a thermomotive member movable into unlatching position in response to heat derived from flow of current through said separate branch, a latch secured in latched position by said latch prop when in its normal cold position and controlling by its position the positions of separate switch contacts, one of said separate switch contacts being mounted upon a double-throw switch arm normally held by said latch in switch-closing position with respect to said preheating circuit but movable in response to release of said latch to a position establishing the normal running circuit, and the other separate switch contact controlled by said latch being one of the aforementioned switch contacts of the separate branch, further means for holding said last-mentioned switch contact in switch-closing position including a cam having a portion effecting said holding at lower operating temperature settings and a portion releasing said last-mentioned switch contact from said switch closing position at higher temperature settings, running circuit means operable independently of said preheating circuit means and including a switch contact upon said double-throw switch arm operable to closed position upon release of said arm by said latch, said running circuit comprising a control switch including a bimetal arm and a contact movable into switch-closing position against its co-acting contact in response to movement of said bimetal arm upon heating and into switch-opening position upon cooling, a further bimetal arm mounted in heat exchange relationship to a vessel resting upon said heating unit, a pilot circuit including a pair of switch contacts movable into switch-opening position upon heating of said further bimetal arm and into switch-closing position upon cooling thereof, said pilot circuit also including resistance heater means in heat exchange relationship with said last-mentioned bimetal arm and said bimetal arm of said control switch, a master switch interconnected in said preheating circuit, said running circuit and said pilot circuit for operation by closure of said master switch to close said preheating and pilot circuits and to condition said running circuit for closure upon subsequent release of said latch and closure of said control switch in response to heating of its bimetal arm by the resistance heater means in heat exchange relation therewith, separate means for closing said master switch and adjusting the temperature conditions required in their respective bimetal strips for opening of said first-mentioned switch contacts and said control switch contacts, and common manually-operated means for effecting simultaneous closure of said master switch, operative adjustment of said cam and movement of said separate adjusting means to their desired settings.

4. In a control apparatus for the energization of a cooking device, the combination comprising a load circuit including an energy supplying heating unit for the cooking operation, a thermomotive member adapted to move a pair of associated contacts of a snap acting switch between open and closed positions in response to temperature changes resulting from the operation of said heating unit, the cooling of the thermomotive member causing closing of said contacts and the heating thereof causing opening of said contacts, means including a second thermomotive member in association with a pair of contacts located remotely from the location of said heating unit having controlling means associated with one contact for controlling the energization of said unit and having a separate adjusting means associated with the other contact for adjusting and selecting the temperature of said unit, the cooling of the second thermomotive member causing closing of said contacts and the heating thereof causing opening of said contacts, and control circuit means independent of said load circuit including said first pair of contacts adapted to cause said second thermomotive member to tend to assume a different position corresponding to every difference in temperature resulting from the operation of said heating unit.

5. The control apparatus of claim 4 in which the second pair of contacts remotely located from the heating unit are affected by a tension strip secured to longitudinal spaced portions of the thermomotive member to augment the movement of the second pair of contacts.

6. The control apparatus of claim 5 in which the tension strip is an elastic metal tension strip and in which the strip and the contacts which it affects are arranged in a load circuit in series with the energy supplying heating unit which is an electric resistance heater.

7. The control apparatus of claim 6 in which the resistance heating unit for the cooking operation is a surface unit for an electric range and the first mentioned thermomotive member which moves in response to temperature changes from the resistance heating unit is located centrally within said heating unit in thermally conductive relationship to the supported position of a cooking vessel on said unit.

8. The control apparatus of claim 7 in which means controlled by the opening and closing of the contacts responding to changes in temperature resulting from the operation of the heating unit control the heating of the thermomotive member associated with and actuating the contacts in the load circuit, and thereby control the load circuit.

9. In a control apparatus for the energization of a cooking device, the combination comprising a load circuit including an energy supplying heating unit for the cooking operation, a thermomotive member adapted to move a pair of associated contacts of a snap acting switch between open and closed positions in response to temperature changes resulting from the operation of said heating unit, the cooling of the thermomotive member causing closing of said contacts and the heating thereof causing opening of said contacts, means including a second thermomotive member in association with a pair of contacts located remotely from the location of said heating unit having controlling means associated with one contact for controlling the energization of said unit and having a separate adjusting means associated with the other contact for adjusting and selecting the temperature of said unit, control circuit means independent of said load circuit including said first pair of contacts adapted to cause said second thermomotive member to tend to assume a different position corresponding to every difference in temperature resulting from the operation of said heating unit, further circuit means operable independently of said control circuit means for establishing an alternative energization of said unit, control means operable to establish initial energization of said unit through said further circuit means, and means operable in response to establishment of a predetermined temperature condition for transferring energization of said unit from said further circuit means to said control circuit means.

10. A control apparatus as defined in claim 9, in which said last-mentioned temperature-responsive means includes a thermomotively-controlled third switch, means for latching said switch in position establishing energization of said unit through said further circuit means, and temperature-responsive means for releasing said latching means.

11. The control apparatus of claim 10 in which the means for latching the third switch is a latch prop and a latch arm held resiliently in latched position by the latch prop during initial energization of the heating unit through the further circuit means and released by the latch prop to transfer the energization of the heating unit from the further circuit means to the control circuit means.

12. The control apparatus of claim 10 in which an electric resistance heater is included in circuit with said energy supplying heating unit when energized through either of said circuit means, a fourth switch including a pair of contacts which are moved into closed position in response to cooling and into open position in response to heat derived from said electric resistance heater, a fifth switch included in a branch parallel to the circuit branch including said fourth switch, and including a pair of contacts in circuit with a thermostatic resistance element interconnected with a switch controlling member to control movement of a third switch to effect said transfer of said energy of said unit from said further circuit means to said first mentioned circuit means.

13. The control apparatus of claim 12, including means for retaining the contacts of the fifth switch in switch-closing position at all times when said control apparatus is set to maintain a temperature of said vessel at least as low as the boiling range, and for releasing said contacts to open position when said control apparatus is set to maintain a temperature above the boiling range.

14. A heat control system for a cooking utensil heated by an electric heating unit comprising: a temperature sensing member in heat transfer relation with the utensil, said sensing member including a first pair of contacts, a first bimetal actuator, a first electric heater, and wall means defining an enclosure therefor, said first bimetal actuator being arranged to open said first pair of contacts in response to an increase in temperature to a predetermined level above the maximum cooking temperature of said utensil and to close said first pair of contacts in response to a decrease in temperature below said predetermined level, said first heater and said first pair of contacts being connected in series in a circuit adapted to be energized by an electric power source; a manually operable temperature selector member including a second pair of contacts for regulating the supply of electric power to said heating unit, a second bimetal actuator arranged to move one of said second pair of contacts toward the other contact in response to a predetermined increase in temperature, a second electric heater in heat transfer relation with said second bimetal actuator, manually operable means for varying the position of one of said second pair of contacts; and electric circuit means including means connecting said second heater in series with said first pair of contacts, and means connecting said second pair of contacts with said heating unit so as to control the supply of power thereto, whereby said first and second heaters are energized and de-energized simultaneously and said second pair of contacts are opened and closed in accordance with the temperature of said sensing member and the setting of said manually operable means.

References Cited in the file of this patent

UNITED STATES PATENTS

| | | |
|---|---|---|
| 2,197,230 | Waddell | Apr. 16, 1940 |
| 2,399,423 | Bletz | Apr. 30, 1946 |
| 2,422,526 | Burch | June 17, 1947 |
| 2,427,945 | Clark et al. | Sept. 23, 1947 |
| 2,666,124 | Vogelsberg | Jan. 12, 1954 |
| 2,685,636 | Vogelsberg | Aug. 3, 1954 |
| 2,701,325 | Altherr | Feb. 1, 1955 |
| 2,727,973 | Collins | Dec. 20, 1955 |
| 2,728,842 | Turner | Dec. 27, 1955 |
| 2,758,175 | Hotchkiss | Aug. 7, 1956 |
| 2,762,885 | Foster | Sept. 11, 1956 |
| 2,790,056 | Fry | Apr. 23, 1957 |
| 2,798,929 | Wojcik | July 9, 1957 |
| 2,806,119 | Williams | Sept. 10, 1957 |
| 2,815,428 | Pearle | Dec. 3, 1957 |
| 2,817,741 | Turner | Dec. 24, 1957 |
| 2,830,164 | Weber et al. | Apr. 8, 1958 |